Feb. 6, 1951 S. J. LESNIAK 2,540,398
APPARATUS FOR DETERMINING THE NUMBER
OF TURNS IN ELECTRICAL COILS
Filed Jan. 15, 1946 3 Sheets-Sheet 1
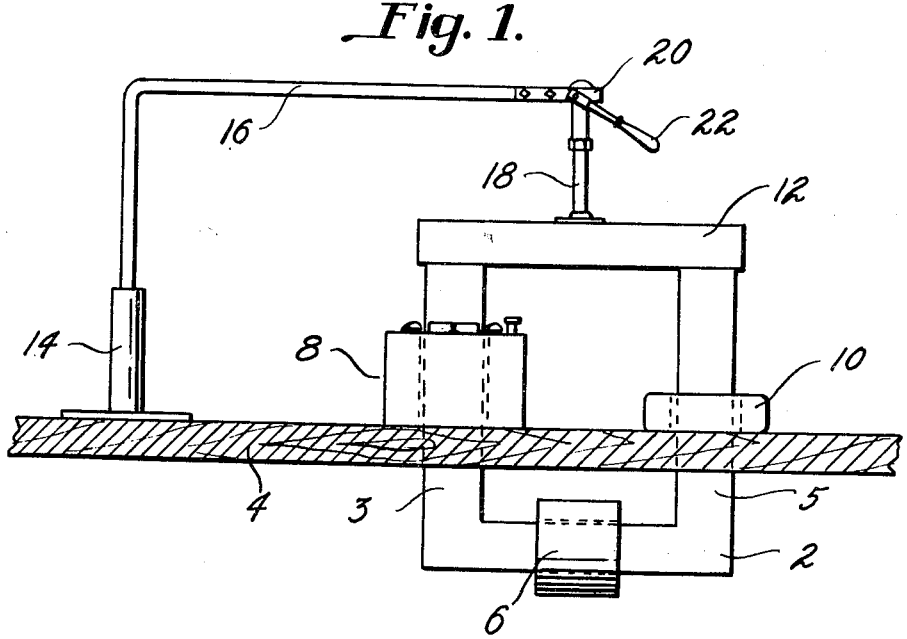
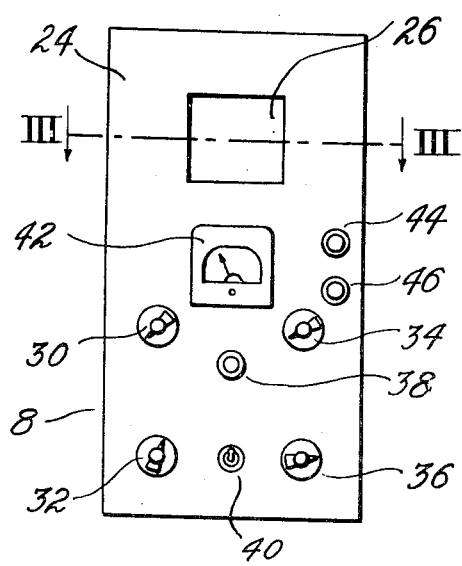
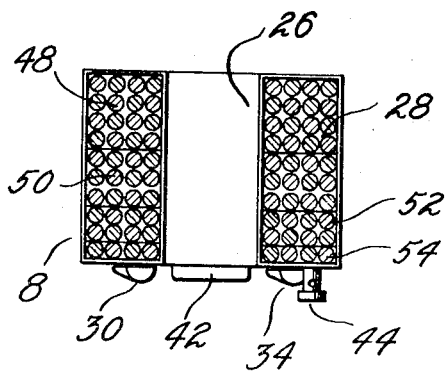
INVENTOR.
Stanley J. Lesniak
BY
Donald G. Dalton
ATTORNEY Feb. 6, 1951 S. J. LESNIAK 2,540,398
APPARATUS FOR DETERMINING THE NUMBER
OF TURNS IN ELECTRICAL COILS
Filed Jan. 15, 1946 3 Sheets-Sheet 2

INVENTOR.
Stanley J. Lesniak
BY Donald G. Dalton
ATTORNEY

Feb. 6, 1951 S. J. LESNIAK 2,540,398
APPARATUS FOR DETERMINING THE NUMBER
OF TURNS IN ELECTRICAL COILS
Filed Jan. 15, 1946 3 Sheets-Sheet 3

INVENTOR.
Stanley J. Lesniak
BY Donald G. Dalton
ATTORNEY

Patented Feb. 6, 1951

2,540,398

UNITED STATES PATENT OFFICE 2,540,398

APPARATUS FOR DETERMINING THE NUMBER OF TURNS IN ELECTRICAL COILS

Stanley J. Lesniak, Chicago, Ill.

Application January 15, 1946, Serial No. 641,384

5 Claims. (Cl. 175—183)

This invention relates to an apparatus for testing coils of wire to determine the number of turns therein.

The invention has among its objects the provision of means whereby the number of turns in a coil of wire, such for example as a rewound magnet coil, may be quickly and accurately determined.

The invention has as a further object the provision of a simple, easily operated apparatus, whereby the testing of coils may be carried out.

These and further objects of the invention will become more readily apparent from the following description.

It is frequently necessary to determine the number of turns in a coil of wire, such as a rewound motor or magnet coil, wherein such number of turns is not visible by inspection. It is essential, however, that replacement coils, such as those enumerated, shall have not only the same resistance but also the same number of turns as the coils they replace if the apparatus is to work efficiently. At present accurate determination of the number of turns in an unknown coil is usually made by counting each turn manually, which is tedious when thousands of turns are involved. In addition, manually counting the turns involves the removal of the insulation which is a costly and unsatisfactory procedure, often resulting in damage to the coil which must then be repaired.

The apparatus of the present invention provides a means whereby the number of turns in a coil of wire with an unknown number of turns may be quickly and accurately determined without necessitating the removal of insulation around the windings. The invention further provides an apparatus of simple and rugged construction, which is easily accessible and portable, for carrying out the above method. The invention involves linking the coil with the unknown number of turns with a magnetic circuit of periodically varying intensity, and linking a known coil with the same magnetic circuit. By "linking" of a coil and a magnetic circuit is meant the passing of the magnetic circuit through the coil. The known coil is constructed to have a selectively variable number of turns, and means are provided to compare the voltage generated by the unknown and known coils, whereby when the voltages are equals the number of effective turns in the known coil equal the number of turns in the unknown coil. The invention will be more readily understood by reference to the accompanying drawings, in which:

Figure 1 is a view in side elevation of one modification of the apparatus of the invention, a table supporting the apparatus being shown in cross section;

Figure 2 is an enlarged view in elevation of the front face of the test cabinet shown in Figure 1 containing the known coil;

Figure 3 is a view in horizontal cross section through the axis of the known coil, the section being taken along the line III—III in Figure 2;

Figure 4:
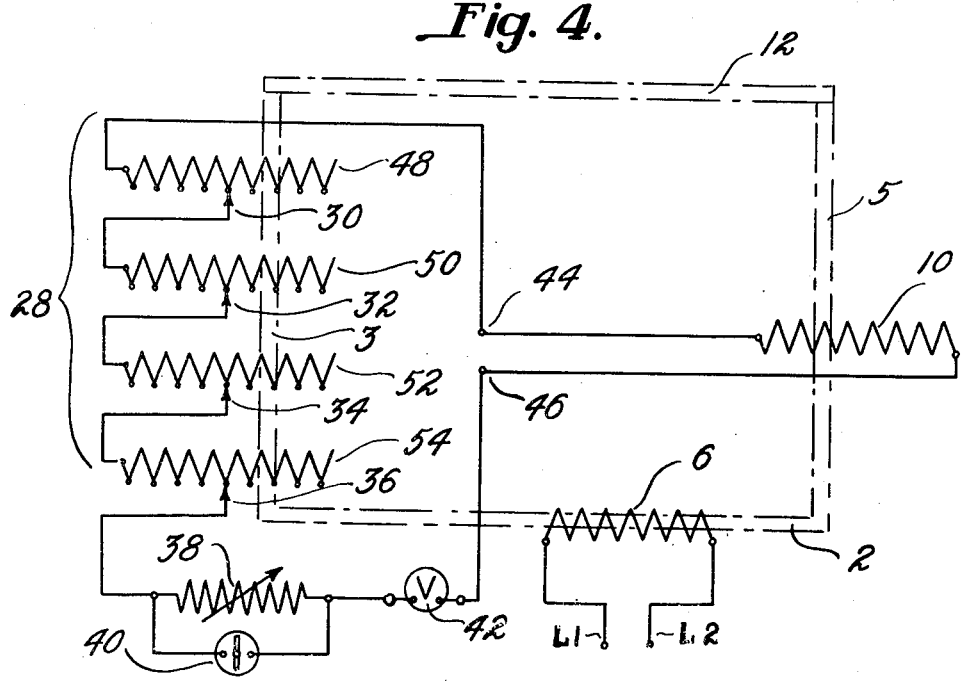
Figure 4 is a wiring diagram of the apparatus shown in Figures 1 to 3, inclusive, with an unknown coil connected thereto.
Figure 5:
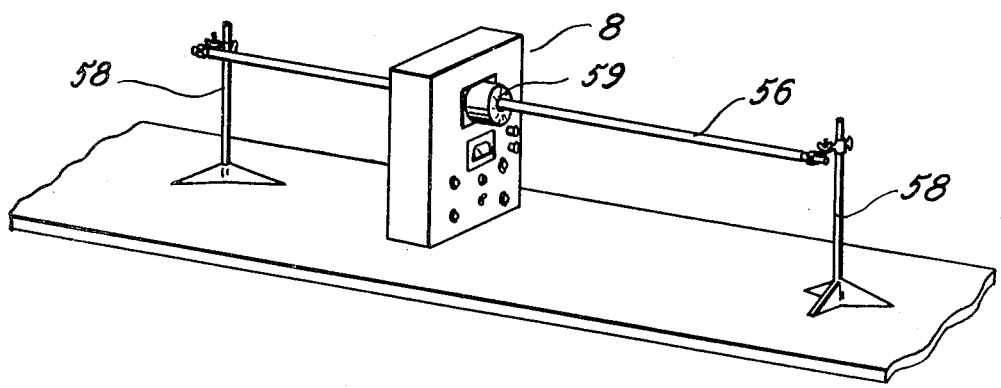
Figure 5 is a view in perspective of another modification of the apparatus of the invention.

In the modification of the apparatus first illustrated, there is provided a U-shaped core 2 of magnetic metal which is preferably formed of laminations, such core having the parallel, substantially identical, vertically extending legs 3 and 5. The core is supported as shown by being attached to the table 4. The core is excited by means of the primary winding 6 which may be supplied with current of periodically varying voltage from leads $L_1$ and $L_2$; such current supply may be alternating or intermittent direct current. For convenience, however, it is preferred that an alternating current source, such as the ordinary 60-cycle alternating current, be employed. There is thus produced a magnetic flux of periodically varying intensity through the magnetic core 2, the circuit being completed through keeper 12, presently to be described, which is positioned across legs 3 and 5 when the apparatus is in use.

About one leg of the magnetic core there is positioned a known coil having a selectively variable number of effective turns. In the apparatus shown such coil 28 is contained in the test cabinet or case 8, the coil being wound so as closely to embrace the internal walls in the cabinet forming the sides of the opening 26 therethrough, as shown in Figure 3. Opening 26 is made of such size and shape that its walls fit closely about leg 3 of the core. The unknown coil 10, which has an axially directed opening therethrough, is placed over the other leg 5 of the core, as shown. The magnetic circuit through the core is completed, as previously described, by the keeper bar 12 which is supported on a standard 14 attached to the table 4, the L-shaped mounting bar 16 on the standard, the vertical rod 18 attached to the keeper bar, and the quick acting raising and lowering means 20 such as a cam clamping means between arm 16 and rod 18, such raising and lowering means being actuated by handle 22. The thus described apparatus allows the keeper bar to be raised from the core and swung out of line to permit the placing of the known and unknown coils over the legs of the core, and their subsequent removal therefrom after completion of the test.

The test cabinet 8, as shown in Figure 2, is provided with a front panel 24 the top center portion of which has a hole therethrough of the same size and shape as the opening 26, previously described. The known coil 28, as above described, closely surrounds such opening, as shown in Figure 3, the eye of the coil being aligned with the opening. Coil 28 is tapped at various known intervals, as shown in Figure 4, so that by the proper combination of effective coil portions the entire range from zero to the maximum number of turns may be attained. In the device illustrated, consecutive taps of switch 30 are connected to the coil part 48 at intervals of every thousand turns. Tap switch 32 is connected to a further portion 50 of the coil, which is connected in series with that first described, so as to tap in at every hundred turns. Tap switch 34 connects to another portion 52 of the coil at every ten turns, and tap switch 36 connects to a still further portion 54 of the coil at every turn. It is thus possible for the device described to connect from 0 to 5000 turns by means of switch 30, from 0 to 1000 turns by means of switch 32, from 0 to 100 turns by operation of switch 34, and 0 to 10 turns by means of switch 36. The operative turns in each of such sections are additive, so that the effective turns of the coil as a whole may be varied from 0 to 6110.

Front panel 24 of the test cabinet is further provided with an operating knob for rheostat 38 and a toggle switch 40, the rheostat being connected in series with the coil 28, as shown in Figure 4, and the switch 40 being connected around the rheostat to short it out of the circuit when the switch is closed. One end of coil 28 is connected to terminal 44, and the other end of the coil connects to the other terminal 46 through the rheostat and the rectifying type A. C. voltmeter 42. Terminals 44 and 46, both of which are conveniently mounted on the front panel, allow the connection of the unknown coil 10 in series with coil 28 when the former is placed about the leg 5 of the magnetic core. As shown in Figure 3, the portions 48, 50, 52, and 54 of known coil 28 are preferably mounted side by side about opening 26 of the test cabinet.

The device described may be operated as follows:

After the test cabinet 8 has been mounted over leg 3 of the core, the unknown coil 10 has been mounted over leg 5, and keeper 12 has been replaced to span legs 3 and 5, the leads from the unknown coil are connected to terminals 44 and 46 in an arbitrary manner. Rheostat 38 is turned to its maximum resistance and switch 40 is turned to its "off" position, after which the primary magnetizing coil 6 is energized from source L₁ and L₂. Rheostat 38 is then turned gradually toward the position of minimum resistance until a reading is obtained on the voltmeter 42. After the reading is noted, the connection of coil 10 to the terminals 44 and 46 is reversed, whereupon the reading of voltmeter 42 is then again noted. If it is found that, with the reverse hook-up, the voltmeter gives a higher reading than that obtained with the first hook-up, the first hook-up was correct and the connections from the unknown coil are reversed to reproduce such hook-up. If, however, the second reading of the voltmeter is less, then the second hook-up is correct and the connections are left in this condition.

With the unknown coil thus correctly hooked into the circuit, tap switches 30 to 36, inclusive, are operated to introduce the correct number of effective turns of the known coil into the circuit so that the voltmeter reads zero. As such final adjustment of the correct number of effective turns of the known coil is approached, the resistance of rheostat 38 may be decreased until finally it may be shorted altogether by the closing of the switch 40. When, with the circuit in this condition, the voltmeter reads zero, the number of effective turns in the known coil will equal the number of turns in the unknown coil.

Such result follows from the fact that the known and unknown coils are linked with the same magnetic circuit of periodically varying intensity. Thus, the voltages generated by the known and unknown coils are equal and when the coils are connected in opposition, their generated voltages cancel to give an algebraic sum of zero. By connecting the coils in opposition, as described, a difference in resistances of the coils, if it exists, does not appear as a factor in the final voltmeter reading, since when the generated voltages of the two coils are equal, the algebraic sum of their voltages is zero, and there is no current flow through the circuit. It is possible, however, if the known and unknown coils are of the same gauge of wire, to connect each to a separate voltmeter and to adjust the number of effective turns of the known coil so that the reading of its voltmeter is the same as the reading of the voltmeter connected to the unknown coil. It will be apparent, however, that it is preferable to connect the coils in opposition in the same circuit as above described. In general it is preferred that the known coil correspond, at least generally, in size and shape, to the unknown coil.

Figure 6:
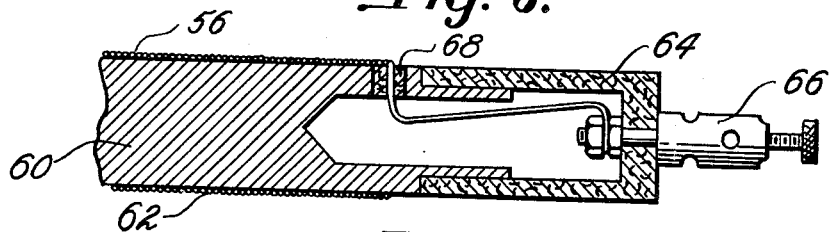
Figure 6 is a view in vertical cross section through the terminal end of the elongated primary coil employed in the latter modification.

In some instances it is desired to test coils having openings therethrough of such small diameter that it would not be possible to place them over the leg of a U-shaped magnetic core, as is required in employing the apparatus shown in Figures 1 to 4, inclusive. For such purpose the apparatus shown in Figures 5 to 8 has proved useful. In this modification the test cabinet 8 containing the known coil 28 may be used as before, but instead of the U-shaped magnetic core 2 with its energizing coil 6, there is employed the long cylindrical magnetic field generator generally designated 56, the field generator having a magnetic core 60 in the form of a straight bar with a relatively small diameter energizing coil thereon, the core and coil having such diameter as to be insertable through the opening in the unknown coil 59. In the apparatus shown, the energizing winding 62 is distributed along the core 60, i. e., it is in the form of a single layer of closely spaced helically coiled wire, the core being provided at each end with a terminal support and connection such as shown in Figure 6. As there shown, there is provided an insulating terminal support in the form of a cap 64 fitting over the reduced portion on the end of the core, so that the terminal support has an effective diameter at least not greater than that of the coil. The end of coil 62 is led through an insulating bushing 68 and is connected, as shown, to the terminal 66. The generator 56 is secured at each end to a supporting standard 58.

Figure 7:
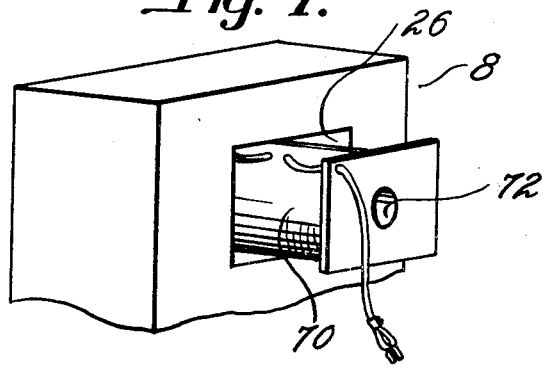
Figure 7 is a view in perspective of a portion of the test cabinet shown in Figure 2 with a supplementary coil partially inserted therein.
Figure 8:
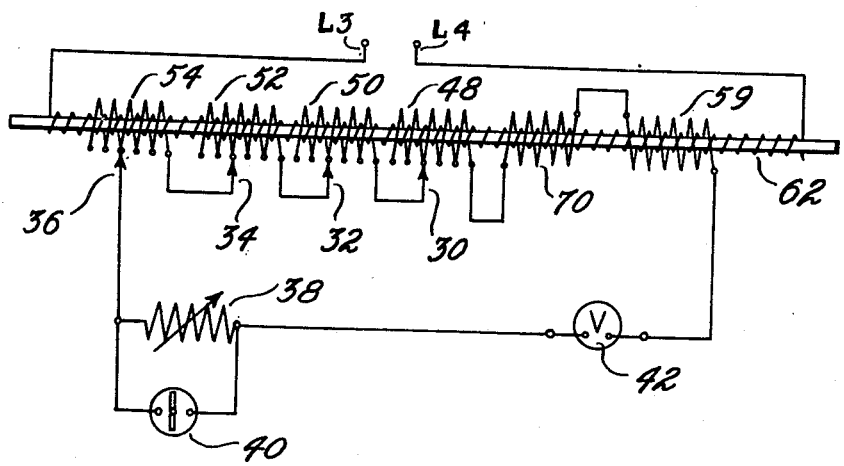
Figure 8 is a wiring diagram of the apparatus shown in Figures 5, 6, and 7.

As shown in the wiring diagram in Figure 8, the energizing coil 62 is connected to a source of current of periodically varying voltage $L_3$ and $L_4$, and the known and unknown coils are connected in opposition in the same manner as described in the first modification. In the modification shown in this figure, however, there is inserted in series with the known coil a further known coil 70 which is inserted as shown in Figure 7, into the opening 26 in the test cabinet. Such supplemental known coil is employed where the number of effective turns on the known coil 28 in the test cabinet is insufficient to allow testing of unknown coils having a large number of turns. When using such supplemental known coil its known number of turns is, of course, added to the number of effective turns employed in coil 28 in the test cabinet 8 when the voltmeter 42 reads zero, to give the correct reading for the number of turns in unknown coil 59.

Since in the case of the apparatus shown in Figures 5 to 8, inclusive, the magnetic circuit is completed through air from the ends of the core 60, it is preferred to position the known and unknown coils near the longitudinal center of field generator 56 and close beside each other. This minimizes the effect of leakage flux, and insures that both the known and the unknown coils will have a magnetic circuit of the same strength passing through them. When the unknown and known coils are so placed on generator 56, considerable variation in inner and outer diameters of the unknown coil as compared to such dimensions of the known coil or coils does not affect the accuracy of determination of the number of turns in the unknown coil.

In instances where an unknown coil is wound around a metal sleeve which cannot be removed without damaging the coil, there may be employed a similar metal sleeve which will then be inserted in opening 26 in the test cabinet so that the magnetic fields acting upon the known and unknown coils will be similarly affected. This insures that both coils will be acted upon by substantially similar magnetic fields, and that thus, when they generate equal voltages, the number of effective turns in each is the same.

Whereas I have illustrated and described preferred modifications of my apparatus for testing coils, it will be apparent that numerous variations are possible within the scope of the invention. What I claim as new, therefore, is set out in the following claims.

I claim.

1. Apparatus for determining the number of turns in an electrical coil comprising a cabinet having a coil therein provided with a plurality of taps, said cabinet having internal walls defining an opening therethrough aligned with the eye of said coil adapted for the insertion of a magnetic core, said coil embracing said walls snugly, switches mounted on said cabinet and connected to said taps for varying the number of effective turns in said coil, and a voltmeter mounted on said cabinet connected to said coil.

2. The apparatus defined by claim 1 characterized by a control rheostat mounted on said cabinet connected in series with said coil.

3. Apparatus for determining the number of turns in an electrical coil comprising a magnetic core having an exciting winding thereon, a coil linking said core and having a plurality of taps, switches connected to said taps adapted to vary the number of effective turns in said coil, said core being adapted to link a coil to be tested, and means for indicating a difference between the voltages induced in said coils, said tapped coil being mounted in a cabinet having internal walls defining an opening therethrough aligned with the eye of the tapped coil and said switches and said indicating means being mounted on an exterior wall of said cabinet.

4. A unitary, self-contained, portable device for determining the number of turns in an electrical coil comprising a case having internal walls defining an opening through the case from front to back adapted to admit a magnetic core, a measuring coil in said case wound snugly around said walls, said measuring coil having a plurality of taps, tap-changing switches connected to said taps and mounted on the front of said case, and a voltmeter mounted in the case and connected to the coil therein.

5. A device as defined by claim 4 characterized by a rheostat mounted in said case and connected in series with said measuring coil, and a knob accessible at the front of said case for operating said rheostat.

STANLEY J. LESNIAK.

REFERENCES CITED

The following references are of record in the file of this patent:

UNITED STATES PATENTS

| Number    | Name         | Date          |
|-----------|--------------|---------------|
| 1,588,539 | Fortescue    | June 15, 1926 |
| 1,676,195 | MacWilliams  | July 3, 1928  |
| 2,146,555 | Arey         | Feb. 7, 1939  |
| 2,326,909 | Wolferz et al.| Aug. 17, 1943|
| 2,412,046 | Hoare        | Dec. 3, 1946  |
| 2,432,948 | Thompson     | Dec. 16, 1947 |
| 2,497,669 | Haley        | Feb. 14, 1950 |
| 2,507,803 | Miller       | May 16, 1950  |

FOREIGN PATENTS

| Number  | Country       | Date          |
|---------|---------------|---------------|
| 449,623 | Great Britain | June 30, 1936 |

OTHER REFERENCES

Radio News, May 1931, pages 989, 1025 and 1027.

Publication, "Coil Short Tests," by Chalfin in Electronic Industries, May 1946, page 77.